April 20, 1965     C. R. TOMPSON     3,179,003
HOROLOGE WITH TIME INDICATION PROJECTED ON SCREEN
Filed April 27, 1962     2 Sheets-Sheet 1

INVENTOR.
Clement R. Tompson
BY
Francis W. Crotty
Atty.

April 20, 1965  C. R. TOMPSON  3,179,003
HOROLOGE WITH TIME INDICATION PROJECTED ON SCREEN
Filed April 27, 1962  2 Sheets-Sheet 2

INVENTOR.
Clement R. Tompson
BY
Francis W. Crotty
Atty.

United States Patent Office 3,179,003
Patented Apr. 20, 1965

3,179,003
HOROLOGE WITH TIME INDICATION
PROJECTED ON SCREEN
Clement R. Tompson, Melrose Park, Ill., assignor to Zenith Radio Corporation, Chicago, Ill., a corporation of Delaware
Filed Apr. 27, 1962, Ser. No. 190,594
5 Claims. (Cl. 88—24)

This invention is broadly directed to a horologe or time indicator and more specifically, to a clock having a digital hour indicator and an azimuth type minute indicator.

The clock art has continuously sought means of indicating the time which may be accurately and rapidly read at a distance and under varying conditions of ambient light level. However, modern design has dictated a trend toward greater compactness in household articles which is seemingly at odds with the objectives of a suitable clock. This is especially true where the clock is located in the environment of a clock-radio.

It is a principal object of this invention to provide an improved horologe.

It is a more specific object of this invention to provide a clock which may be accurately and rapidly read under varying ambient light conditions.

It is a further object of this invention to provide a clock which may be rapidly and accurately read at varying viewing distances from the clock.

It is yet another object of the invention to provide a clock to achieve the above objects but which is inexpensive and simple in construction.

In accordance with the above objects a horologe is provided for indicating time in hours and minutes and comprises a digital readout device for indicating the hour. The readout device includes a translucent screen area and a light source having a beam path to the translucent screen area. Light impeding means are provided having a portion intermediate the light source and the screen area and includes a movable device having light transparent areas, each of said areas designating a particular hour, and adapted to be interposed in the beam path to allow light to be projected through a selected area onto the translucent screen to form an image thereon to indicate the hour. Means are coupled to the movable device for successively changing the areas in the beam path only once each hour. Other means for displaying the minute are provided by an azimuth indication along the circumference of the screen area which includes means for moving the azimuth indication along the circumference.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
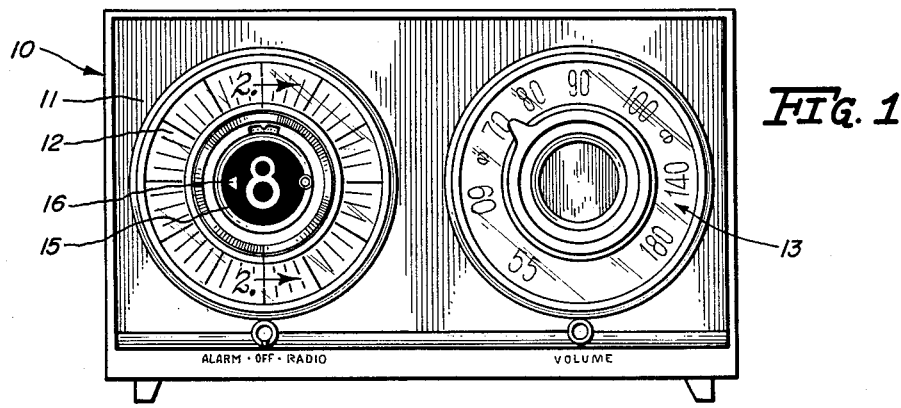
FIGURE 1 is an elevational view of a clock-radio embodying the present invention.

Referring to the drawings, FIGURE 1 shows a clock-radio including a case 10 having a front panel 11 with the left side of the panel containing a clock face 12 and the right side a radio dial and indicator 13. The hour is indicated by an hour numeral appearing in the central portion of a circular viewing area 15 as illustrated by the number 8. Minutes are indicated by a triangular shaped area serving as a minute hand 16 which is normally illuminated to contrast with the remainder of area 15 and which has a circular path of travel around the periphery of the area. Thus, the time now indicated by clock face 12 in FIGURE 1 is 8:45.

Figure 2:
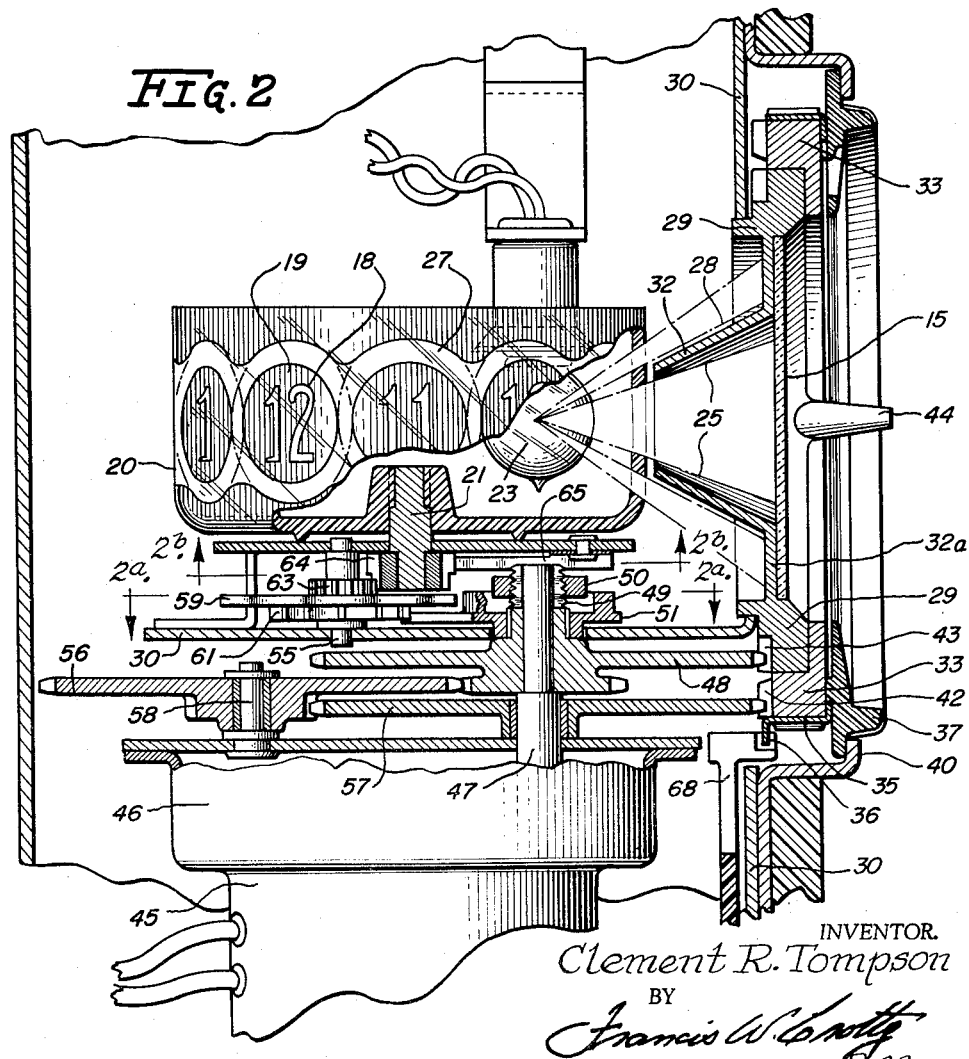
FIGURE 2 is a sectional view partially cut away taken along line 2—2 of FIGURE 1.

The hour indicating mechanism is in essence a digital readout device, the details of which are best shown in FIGURE 2. The mechanism includes light impeding means between a light source and area 15 and means for selectively placing light transparent areas, individually designating a particular hour, in the beam path of the light source to area 15. Thus, the light projected through a selected light transparent area forms an hour image on viewing area 15. More specifically, the digital readout device comprises a plurality of light transparent portions 18 each of which is arranged in a definite pattern to designate a particular hour. For example, as shown in FIGURE 2, the hours 1, 12 and 11 are illustrated. The transparent patterns are placed against a circular opaque background 19. Numbers 18 and their associated opaque areas 19 are placed around the circumference of a cup-shaped rotatable member 20 which is driven by a shaft 21 connected to a timing mechanism in a manner to be explained hereafter. Thus, the light impeding means include the opaque portions 19 of cup-shaped member 20 surrounding and defining the transparent indicia patterns 18. A light source 23 is positioned in cup-shaped member 20 to project light through the particular one of light transparent portions 18 which at that moment is presented to the viewing area 15 which comprises a screen of translucent material. The numeral image projected on translucent screen 15 has a maximum diameter indicated by light beam path projection lines 25. The image occupies a substantial proportion of screen 15 since its maximum diameter as illustrated in the preferred embodiment is approximately one-half the total diameter of viewing area 15.

Translucent screen 15 is retained in an annular frame 29 which, in turn, is journalled on a frame 30 of the clock. Frame 29 includes a truncated conical light shield 32 connected thereto by a disc portion 32a which conforms generally in shape to projection lines 25 to shield the hour image projected on screen 15 from all other external sources of light.

Figure 3:
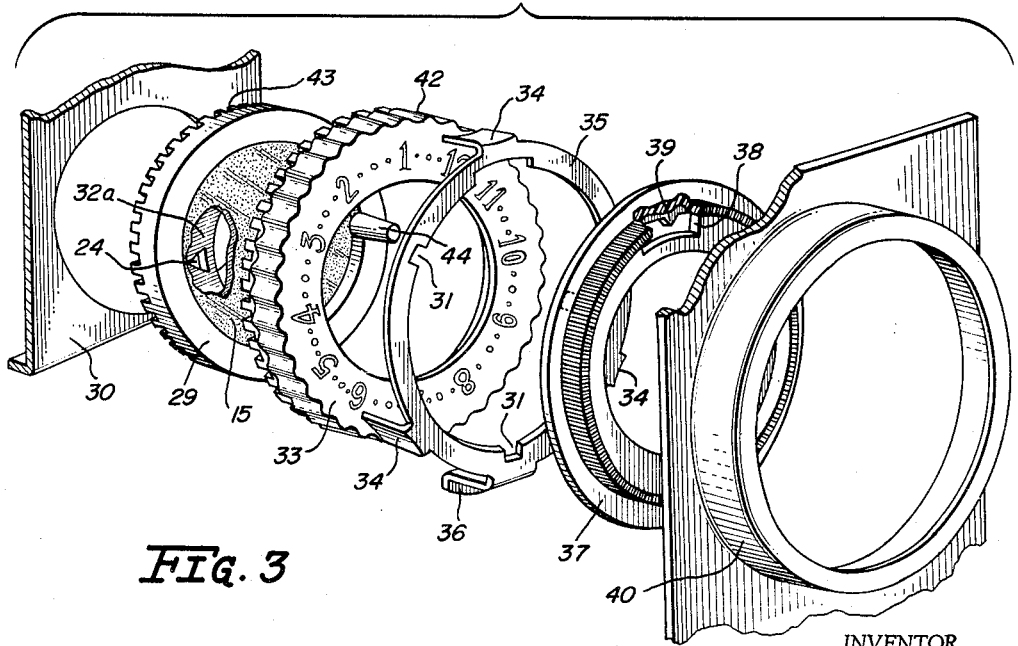
FIGURE 3 is an exploded view of a portion of the clock of FIGURE 1.

The illuminated minute hand 16 shown in FIGURE 1 is achieved by utilizing light source 23 to illuminate that portion of screen 15 which is exposed by a triangular cutout 24 in disc portion 32a shown in FIGURE 3. Light from source 23 is channeled to cutout 24 by means of transparent annular areas 27 on cup-shaped member 20 which circumscribe each circular opaque area 18. The projection of light through an area 27 is shown by projection lines 28 which delineate a beam path of sufficient width to illuminate cutout 24 but at the same time exclude additional light from entering into the space enclosed by light shield 32.

Several other circular members are arranged concentrically with frame 29, as best shown in FIGURE 3, and are essentially for the purpose of actuating a switch at a predetermined time to either turn on an alarm or the radio. Journalled on frame 29 is an alarm time scale 33 which has an hour scale around its periphery. It also includes a scalloped edge portion to receive detents 34 of a ring actuator 35. Ring actuator 35 includes an actuating lever 36 whose function will be explained in detail below. A knurled actuating knob 37 having a window 38 and a pointer 39 is affixed to ring actuator 35 by means of lugs extending from the rear of knob 37 (not shown) which engage slots 31 in the inner periphery of actuator 35. This entire assembly is retained on frame 30 by a retaining ring 40.

Pointer 39 may be moved to any position on scale 33 by rotating knurled knob 37. Ring 35 is moved concurrently with actuator knob 37 to locate actuating lever 36 in a position determined by the setting of pointer 39 on scale 33. Scale 33 is provided with gear teeth 42 around its periphery and in conjunction with actuating ring 35 and knob 37 forms a unitary unit rotating at a speed of 1/12 of a revolution per hour when actuated by a gear which mates with gear teeth 42. Similarly, annular frame 29 has gear teeth 43 around its periphery and is rotated at a speed of one revolution per hour. Manual means for rotating frame 29 are provided by a horizontal extending lever 44.

Figure 2A:
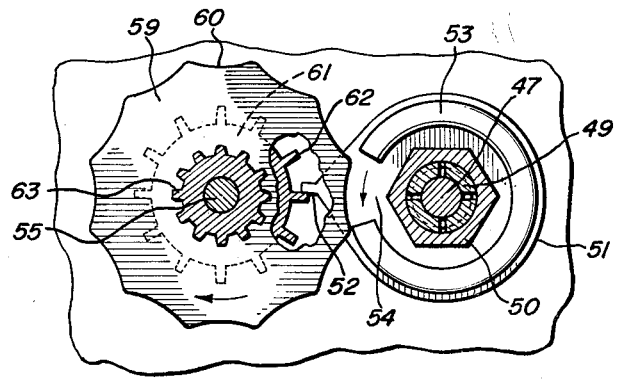
FIGURE 2a is a partial sectional view taken along line 2a—2a of FIGURE 2.

Referring now to FIGURE 2, cup-shaped member 20, frame 29 and alarm scale 33 are all driven by a motor 45 having a speed reduction gear train 46 with an output shaft 47 having a rotational speed of one revolution per hour. Shaft 47 is coupled to a gear 48 which is frictionally held to shaft 47 by an extended section which is slotted to form four resilient fingers 49. As shown in FIGURE 2a, fingers 49 are biased against shaft 47 by a nut 50 threaded on the outside of the legs. Gear 48 meshes with gear teeth 43 of frame 29. Thus, frame 29 is rotated at speed of one revolution per hour which, of course, is consistent with its function of retaining screen 15 which includes minute hand 16. Gear 48 is also coupled to alarm scale 33 and its associated gear teeth 42 by means of two speed reduction gears 56 and 57 which are respectively freely journalled on a stud 58 and shaft 47 rotate alarm scale 33 at a speed of 1/12 of a revolution per hour.

Figure 2B:
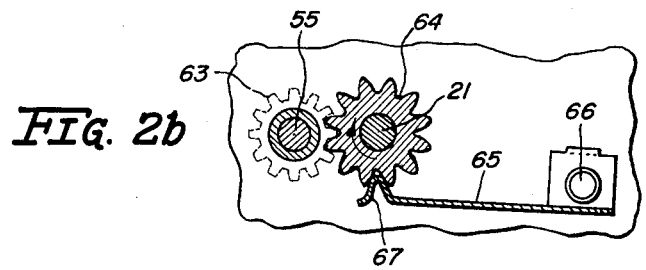
FIGURE 2b is a partial sectional view taken along line 2b—2b of FIGURE 2.

Means for driving drum 20, shown in FIGURES 2, 2a and 2b include a pawl actuator 51 which is permanently affixed to gear 48 having a pawl extension 52 and a raised annular segment 53 with a gap 54. A Geneva wheel 59 is mounted on a shaft 55 and has 12 arcuate scalloped edges 60 each edge being on an arc whose radius is equal to the radius of annular ring 53. Geneva wheel 59 is sandwiched between and rotates with a driven gear 61 and a coupling gear 63 both of which are mounted on shaft 55. Gear 61 includes 12 teeth 62 which successively mesh with pawl extension 52. Thus, 12 revolutions of pawl actuator 51 revolves gear 61 and its associated Geneva wheel one revolution. However, this single revolution is accomplished in 12 intermittent steps by a detent mechanism now to be described. Coupling gear 63, as best shown in FIGURES 2a and 2b, meshes with the bottom portion of a gear 64 fixed to shaft 21. The top portion of gear 64 has enlarged teeth especially adapted to mate with a detent spring 65 which is fastened to the frame of the clock by a rivet 66. Gear 64 has 12 teeth and therefore, the distance between the crowns of the individual teeth is 30°. Detent spring 65 rotates gear 64 into its next indexed position when the apex of a V-shaped end 67 has just passed a point of tangency with the crown of a tooth of gear 64; i.e., after 15° of rotation. At this point the spring action of detent spring 65 causes V-shaped end 67 to ride down the opposite side of the tooth to rotate gear 64. Thus, pawl actuator 51 need only move Geneva wheel 59 approximately 15° to achieve rotation of gear 64 to its next detented position.

Scalloped edges 60 of wheel 59 and ring 53 are spaced for mating engagement with each other during periods when pawl extension 52 is out of engagement with teeth 62; that is after pawl 52 has actuated gear 61. The above mating provides a positive lock to prevent gear 62 and drum 20 from losing synchronization with shaft 47.

The above change in the hour number is of course accomplished while minute hand 16 on screen 15 is passing through its 12 o'clock or vertical position. As mentioned above this synchronization is positively maintained by the mating of edges 60 of Geneva wheel 59 with annular segment 53 of pawl actuator 51.

Since rotation of gear 64 controls the movement of cup-shaped body 20 and numbers 18 indicating the hour it is desirable that the change from one hour to the next be made as quickly as possible or in other words with a "snap action change." The above described detent mechanism achieves this objective by providing that gear 64 need be actuated only 15° or 1/24 of a revolution before the detent spring rapidly rotates it to its next position. Another means of reducing the switching time between hour numbers is the construction of pawl actuator 51 with pawl 52 on a larger radius from its center rotation than are teeth 62 of gear 61. Thus, following well known geometric principles, pawl 52 need be rotated only 10° to achieve 15° of rotation for a tooth 62 with which it is engaged at that time. In terms of time, this 10° of rotation of actuator 51 amounts to about 1 2/3 minutes since the actuator rotates one revolution per hour. However, the actual time during which the hour display is illegible to the viewer is only 50 seconds since during the remainder of the 1 2/3 minutes the hour numeral is shifting toward the edge of screen 15 and is therefore still legible.

Referring now to FIGURES 2 and 3 alarm actuating lever 36 is positioned by rotating knob 37 until pointer 39 indicates the desired actuating time on scale 33. Rotation of knob 37 of course moves actuating lever 36 to a position which is determined by the setting of pointer 39. An actuating cam 68, shown in FIGURE 2, is placed in the path of lever 36 in a predetermined location such that when the clock indicates the time selected on scale 33 lever 36 engages cam 68 to either actuate an alarm mechanism (not shown) or turn on the radio. Note that as shown in FIGURE 2 frame 29 and scale 33 are held in synchronism with each other by gear train 48, 56 and 57.

The clock may also be initially set to read the proper time by movement of horizontally extending lever 44 on frame 29 which rotates gear 48 to move the drum 20. The friction fit of gear 48 on shaft 47 allows the gear to rotate with respect to shaft 47.

Thus, the invention provides a clock which may be accurately and rapidly read under varying ambient light conditions and at varying viewing distances. This is accomplished by the spot light projection of both the hour numeral and azimuth indication and by the novel construction of a large digital display of the hour with the minute hand having a circular path of travel around the periphery of the viewing area. This in effect is maximum utilization of the available viewing area. The clock is easily read since minutes are indicated by an azimuth type system as compared to the cluttered display of an all numeral clock.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A projection clock for indicating time in hours and minutes comprising:
   a digital readout device for indicating the hour including
   a translucent screen area,
   a light source having a beam path to said translucent screen area,
   light impeding means having a portion thereof intermediate said light source and said screen area including a movable device having light transparent areas, each of said areas designating a particular hour, adapted to be interposed in said beam path to allow light to be projected through a selected area onto said translucent screen to form an image thereon indicating the hour, and means coupled to said movable device for successively changing said areas in said beam path only once each hour;

and means for displaying the minute by an azimuth indication along the circumference of said screen area, including means for moving said azimuth indication along said circumference.

2. A projection clock according to claim 1 in which said area changing means includes a snap action changing mechanism for successively placing said areas in said beam path.

3. A projection clock for indicating time in hours and minutes comprising:
   a digital readout device for indicating the hour including
   a translucent screen area,
   a movable device having a plurality of light transparent portions arranged in a predetermined pattern, each of said portions being individually shaped to designate a particular hour,
   a light source positioned to project light through a selected one of said light transparent portions to form an image thereof on said translucent screen area indicating the hour, and means coupled to said movable device for successively changing the one of said light transparent portions in said beam path only once each hour;
   and means for displaying the minute by an azimuth indication along the circumference of said screen area, including means for moving said azimuth indication along said circumference.

4. A projection clock according to claim 3 in which the said image occupies a substantial portion of said translucent screen area.

5. A projection clock for indicating time in hours and minutes comprising:
   a digital readout device for indicating the hour including
   a translucent screen area,
   a plurality of light transparent portions arranged in a predetermined pattern, each of said portions being individually shaped to designate a particular hour, and
   a light source positioned to project light through a selected one of said light transparent portions to form an image thereof on said translucent screen area indicating the hour, said image occupying a substantial proportion of said area;
   means for rotating said screen area at the rate of one revolution per hour;
   and a minute hand comprising a contrasting area on said screen having a path of travel along the circumference of said screen area.

References Cited by the Examiner
UNITED STATES PATENTS

| | | | |
|---|---|---|---|
| 1,275,791 | 8/18 | Thereault | 58—139 |
| 2,040,421 | 5/36 | Almquist | 58—125 |
| 2,886,942 | 5/59 | Stucky | 58—126 |

FOREIGN PATENTS

| | | |
|---|---|---|
| 68,233 | 10/57 | France. |

LEYLAND M. MARTIN, *Primary Examiner.*

WILLIAM MISIEK, *Examiner.*